United States Patent
Printemps et al.

(10) Patent No.: US 10,664,622 B2
(45) Date of Patent: May 26, 2020

(54) METHOD FOR MANAGING A REAL-TIME CLOCK IN A PORTABLE TAMPER-RESISTANT DEVICE

(71) Applicant: GEMALTO SA, Meudon (FR)

(72) Inventors: Morgan Printemps, Cedex (FR); Ali Zeamari, Cedex (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 16/068,421

(22) PCT Filed: Mar. 21, 2017

(86) PCT No.: PCT/EP2017/056620
§ 371 (c)(1),
(2) Date: Jul. 6, 2018

(87) PCT Pub. No.: WO2017/182215
PCT Pub. Date: Oct. 26, 2017

(65) Prior Publication Data
US 2019/0012485 A1  Jan. 10, 2019

(30) Foreign Application Priority Data

Apr. 20, 2016  (EP) ..................... 16305454

(51) Int. Cl.
*G06F 21/72* (2013.01)
*G06F 1/14* (2006.01)
(Continued)

(52) U.S. Cl.
CPC .............. *G06F 21/725* (2013.01); *G06F 1/14* (2013.01); *G06F 21/77* (2013.01); *G06Q 20/40* (2013.01)

(58) Field of Classification Search
CPC .......... G06F 21/725; G06F 1/14; G06F 21/77; G06Q 20/40
See application file for complete search history.

(56) References Cited

U.S. PATENT DOCUMENTS 5,892,900 A * 4/1999 Ginter ..................... G06F 21/10
726/26
6,597,180 B1  7/2003 Takaoka et al.
(Continued)

FOREIGN PATENT DOCUMENTS

EP  1 229 424 A2  8/2002
EP  1 480 174 A1  11/2004
(Continued)

OTHER PUBLICATIONS

J. X. Lee, Z. W. Lin, P. S. Chin and K. P. Yar, "One way ranging time drift compensation for both synchronized and non-synchronized clocks," 2010 International Conference on System Science and Engineering, Taipei, 2010, pp. 327-331. (Year: 2010).*
(Continued)

*Primary Examiner* — Robert B Leung
*Assistant Examiner* — Sameera Wickramasuriya
(74) *Attorney, Agent, or Firm* — Buchanan Ingersoll & Rooney PC

(57) ABSTRACT

A computer-implemented method for managing a real-time clock having a drift and being embedded in a portable tamper-resistant device, which receives applicative data when performing a banking transaction with another device. comprises a step of extracting a time from the applicative data, the method also includes a step of compensating the drift by updating the real-time clock based on said time.

17 Claims, 4 Drawing Sheets

(51) Int. Cl.
*G06F 21/77* (2013.01)
*G06Q 20/40* (2012.01)

(56) References Cited

U.S. PATENT DOCUMENTS

| | | | | |
|---|---|---|---|---|
| 7,124,302 | B2* | 10/2006 | Ginter | G06F 21/10 |
| | | | | 713/189 |
| 8,533,851 | B2* | 9/2013 | Ginter | G06F 21/10 |
| | | | | 713/193 |
| 2004/0044924 | A1* | 3/2004 | Marik | G06F 1/14 |
| | | | | 713/502 |
| 2004/0128528 | A1* | 7/2004 | Poisner | G06F 1/14 |
| | | | | 713/322 |
| 2004/0128549 | A1* | 7/2004 | Poisner | G06F 1/14 |
| | | | | 726/22 |
| 2007/0127528 | A1 | 6/2007 | Beyer | |
| 2008/0277482 | A1* | 11/2008 | Parlange | G06K 19/0701 |
| | | | | 235/492 |
| 2009/0307520 | A1* | 12/2009 | Anselmi | G06F 1/12 |
| | | | | 713/600 |
| 2011/0035511 | A1* | 2/2011 | Biederman | G04G 7/00 |
| | | | | 709/248 |
| 2014/0095887 | A1* | 4/2014 | Nayshtut | G06F 21/57 |
| | | | | 713/189 |
| 2015/0170016 | A1 | 6/2015 | Avagliano | |
| 2015/0378322 | A1* | 12/2015 | Bruins | G04R 20/00 |
| | | | | 368/47 |
| 2018/0088625 | A1* | 3/2018 | Krithivas | G06F 1/14 |

FOREIGN PATENT DOCUMENTS

| | | |
|---|---|---|
| EP | 2 273 416 A1 | 1/2011 |
| JP | 2000-258486 A | 9/2000 |
| JP | 2005-510796 A | 4/2005 |
| JP | 2011-120146 A | 6/2011 |
| WO | 03/046723 A2 | 6/2003 |

OTHER PUBLICATIONS

Rousseau, Ludovic. "Secure time in a portable device." Gemplus Developer Conference. 2001. (Year: 2001).*
International Search Report (PCT/ISA/210) dated Apr. 19, 2017, by the European Patent Office as the International Searching Authority for International Application No. PCT/EP2017/056620.
Written Opinion (PCT/ISA/237) dated Apr. 19, 2017, by the European Patent Office as the International Searching Authority for International Application No. PCT/EP2017/056620.
Written Opinion dated Oct. 9, 2019, by the Japanese Patent Office in corresponding Japanese Patent Application No. 2018-539391 and English translation. (6 pages).
Office Action dated Sep. 10, 2019, by the Japanese Office, in corresponding Japanese Patent Application No. 2018-539391and English translation. (8 pages).
Decision on Rejection dated Mar. 17, 2020 issued by the Japanese Patent Office in corresponding Japanese Application No. 2018-539391 and English language translation. (5 Pages).

* cited by examiner

METHOD FOR MANAGING A REAL-TIME CLOCK IN A PORTABLE TAMPER-RESISTANT DEVICE

FIELD OF THE INVENTION

The present invention relates to methods of managing a real-time clock embedded in a portable tamper-resistant device. It relates particularly to methods of synchronizing a real-time clock embedded in a portable tamper-resistant device.

BACKGROUND OF THE INVENTION

Portable tamper-resistant devices are small devices comprising a memory, a microprocessor and an operating system for computing treatments. Such secure elements may comprise a plurality of memories of different types, like non-volatile memory and volatile memory. They are tamper-resistant (or "secure") because they are able to control the access to the data they contain and to authorize or not the use of data by other machines. A portable tamper-resistant device may also provide computation services based on cryptographic components. In general, portable tamper-resistant devices have limited computing resources and limited memory resources and they are intended to be connected to a host machine which provides them with electric power. For example, smart cards are a kind of portable tamper-resistant devices.

A portable tamper-resistant device may contain applications and their associated applicative data which encompass user data, file systems and secret key.

A portable tamper-resistant device may contain a real-time clock—also named RTC—which may be used to compute data based on a time reference. For example, such RTC may be used to generate time-based One Time Password (OTP) that are valid during a preset duration.

The RTC is powered by a power source embedded in the portable tamper-resistant device. Thus the RTC is continuously running even if no power is provided by another device (such as a reader intended to communicate with the portable tamper-resistant device).

Due to physical RTC characteristics, the time value provided by a RTC generally deviate from a fully reliable clock reference. The difference between them is known as the drift. The drift increases over time and can depend on the temperature for example. The drift can become unacceptable (out of tolerance range) for some applications. For instance, the drift may grow by two seconds each day leading to a huge gap.

It is known to send a synchronization command from a server to a portable device for updating the current time of the RTC in order to remove the drift. In this case, the server has to take care of the synchronization need for the device since it must regularly send specific synchronization commands. Moreover, this burden can be very big for a server intended to manage a large fleet of portable devices.

There is a need for allowing an automatic synchronization of the RTC of a portable device irrespective of sending of commands dedicated to synchronization by a server.

SUMMARY OF THE INVENTION

An object of the invention is to solve the above mentioned technical problem.

The object of the present invention is a method for managing a real-time clock embedded in a portable tamper-resistant device. The portable tamper-resistant device receives applicative data when performing a banking transaction with a second device. The method comprises a step of extracting a time from the received applicative data and a step of updating the real-time clock using said time.

Advantageously, the banking transaction may be either a payment transaction, a request for banking authorization or a re-credit.

Advantageously, the method may comprise a step of collecting a set of time values from a plurality of banking transactions, each time value of said set being associated with a time reference provided by the real-time clock. The method may comprise a step of analyzing the set according to a preset rule for generating a corrective value and the real-time clock may be updated thanks to the corrective value.

Advantageously, the portable tamper-resistant device may comprise a secure element configured to use said applicative data for performing the banking transaction, the portable tamper-resistant device may comprise a processor unit able to update the real-time clock and said processor unit may detect that said applicative data are sent to the secure element.

Advantageously, said processor unit may retrieve said applicative data by spying data exchanged between the secure element and the second device.

Advantageously, said processor unit may get said time by sending a request to the secure element.

Another object of the invention is a portable tamper-resistant device comprising a real-time clock and a secure element able to perform a banking transaction with a second device and to receive applicative data from the second device when performing the banking transaction. The portable tamper-resistant device comprises a processor unit adapted to detect that said applicative data are sent to the secure element, to extract a time from said applicative data and to update the real-time clock using said time.

Advantageously, the secure element may have a physical communication interface for receiving said applicative data. The processor unit may be adapted to spy data exchanged through the physical communication interface, to retrieve the time from the applicative data, to get a time reference from the real-time clock and to store a captured value in a set, said captured value reflecting the drift between the time and the time reference associated with the time. The processor unit may be adapted to analyze the set according to a preset rule for generating a corrective valve and to update the real-time clock thanks to the corrective value.

Advantageously, the secure element may be configured to store a log comprising the applicative data. The processor unit may be adapted to store in a set a reference time provided by the real-time clock, said reference time being associated with the applicative data. The processor unit may be adapted to get the applicative data by sending a request to the secure element and the processor unit may be adapted to analyze both the applicative data and the set according to a preset rule for generating a corrective value and to update the real-time clock thanks to the corrective value.

Advantageously, the portable tamper-resistant device may be a bank smart card.

BRIEF DESCRIPTION OF THE DRAWINGS

Other characteristics and advantages of the present invention will emerge more clearly from a reading of the following description of a number of preferred embodiments of the invention with reference to the corresponding accompanying drawings in which.

DETAILED DESCRIPTION OF THE PREFERRED EMBODIMENTS

The invention may apply to any type of portable tamper-resistant device intended to carry out banking transactions comprising a time stamp in clear (plain value). Such portable tamper-resistant devices may be a smart card, a contactless token, a USB token, a smartphone or a wearable device (like a smart watch or a ring) for example.

The invention relies on the fact that, when running a banking transaction, the portable tamper-resistant device receives banking applicative data which comprise a reliable time.

Figure 1:
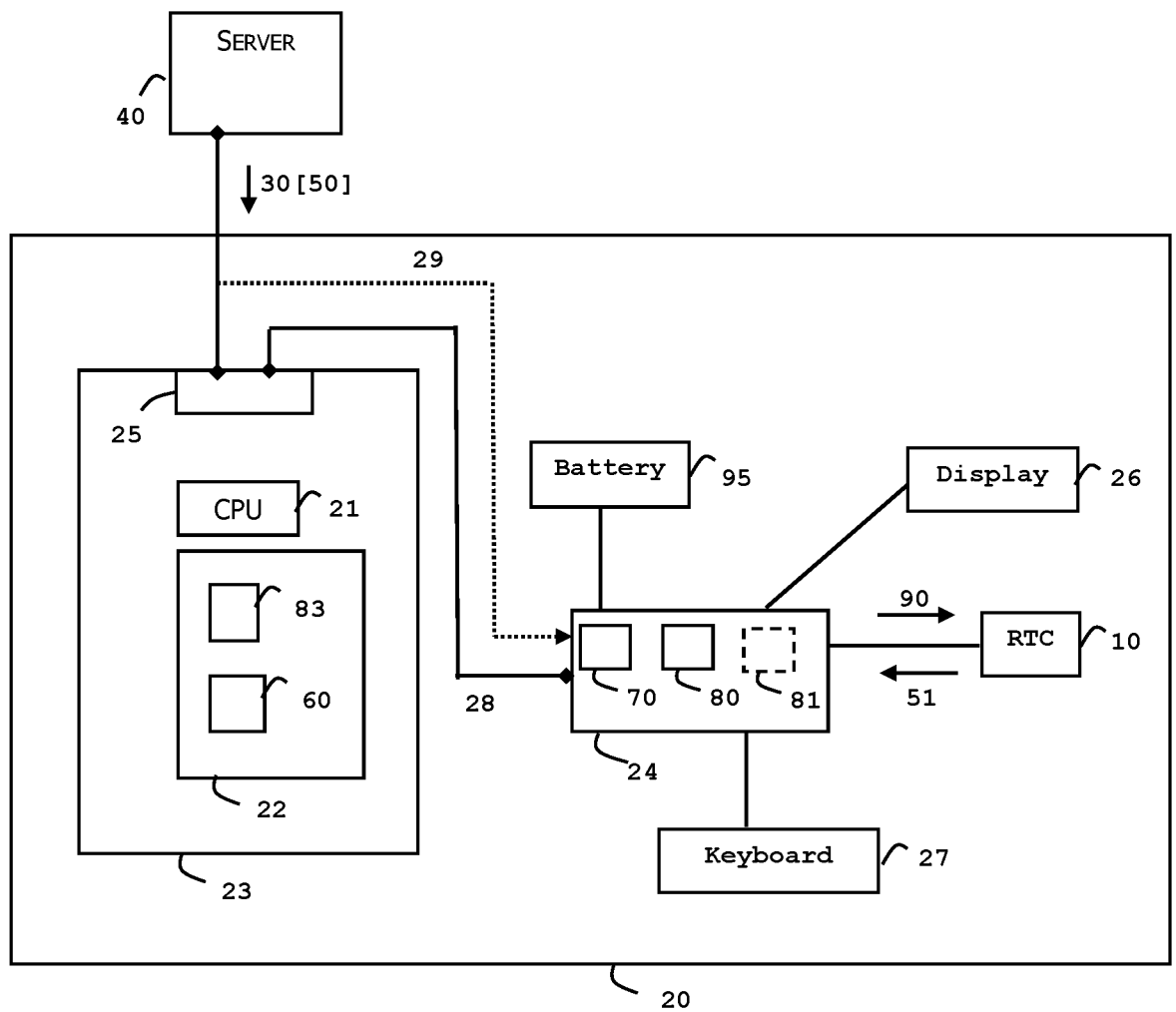
FIG. 1 shows a diagram of a portable tamper-resistant device according to an example of the invention.

FIG. 1 shows an example a diagram of a portable tamper-resistant device according to an example of the invention.

In this example, the portable tamper-resistant device 20 is a bank smart card.

The portable tamper-resistant device 20 comprises a chip 23 (also called secure element), a battery 95, a display 26, a keyboard 27, a RTC 10 and a processing unit 24 (also named processor unit).

The processing unit 24 is connected to the battery 95, the display 26, the keyboard 27 and the RTC 10. The processing unit 24 is in charge of managing output of data through the display 26, input of data through the keyboard 27. The processing unit 24 is able to retrieve the current time from the RTC, to provide power (coming from the battery 95) to the RTC 10 and to set (synchronize) a new time in the RTC 10.

The chip 23 comprises a physical communication interface 25 able to communicate with a smart card reader (not shown) and allowing communication with the server 40 through a smart card reader. In this example, the communication interface 25 is designed to communicate through ISO-7816 protocols. Alternatively, it may be designed to communicate through a wireless protocol. The chip 23 comprises a processing unit 21 and a non-volatile memory (NVM) 22.

The non-volatile memory 22 comprises a banking application 60 which is designed to carry out banking transactions with the server 40. The banking application 60 is a customary banking application able to store, in the NVM 22, a log 83 comprising applicative data related to banking transactions.

In a preferred embodiment the chip 23 complies with Specifications from EMV-CO®, EMV 4.2 BOOK3 June 2008.

Alternatively, the chip 23 may comply with Electronic PURSE MONEO™ PME specifications version DSI9A wherein the "Debit" command contains the transaction time with under the 'YY MM DD HH MM SS' format.

In one example, a spying link 29 (shown in dotted line) is set between the processing unit 24 and the physical communication interface 25. Thanks to the spying link 29, the processing unit 24 can spy all data exchanged between the chip 23 and the external device 40 (i.e. server, reader or any connected machine). The processing unit 24 comprises an updating agent 70 which is configured to analyze the spied data retrieved via the spying link 29 in order to get the applicative data 30 exchanged between the chip 23 and the external device 40. In addition, the updating agent is able to identify a time 50 from the spied applicative data 30 and to detect that the corresponding banking transaction has been successfully run.

According to an example of EMV® transaction, data exchanged through the chip 23 and the external device 40 stay contain the following:

```
  ......
  Verify PIN:
  0x0020008008 Data In: 241234FFFFFFFFFF
  SW: 0x9000
  Generate Application cryptogram:
  0x80AE400020 Data In:
0x000000000001000000000002084000000000000084012030200123
45678235901
  Data Out:
0x771E9F2701409F360200019F26082EB366E1F1ECDD529F1007060
10A03940000
  SW: 0x9000
  ......
  wherein the date of the transaction is 12/03/02
and time of the transaction is 23:59:01.
```

In another example, the processing unit 24 can be adapted to spy the communication between the external device 40 (server or reader) add the chip 23 (or to spy the physical communication interface 25) in order to detect the beginning of a banking transaction. Once the banking transaction is completed successfully (e.g. response 0x9000 sent by the chip 23), the processing unit 24 gets the timestamp from the applicative data exchanged during the transaction.

The updating agent 70 is configured to gets a time reference 51 from the RTC 10 when a banking transaction is detected thanks to the spying link 29. The updating agent 70 is configured to store, in a set 80, a captured value reflecting the drift between the spied time 50 and the time reference 51. For instance the captured value may be the pair: (spied time 50, time reference 51). Alternatively, the captured value may be the measured drift (difference between spied time 50 and time reference 51).

It is to be noted that the processing unit 24 has access to its own non-volatile memory area for storing the set 80.

The updating agent 70 is configured to store as many captured values as spied banking transactions. The content of the set 80 may be deleted after a successful synchronization of the RTC.

The updating agent 70 is configured to analyze the set 80 when a preset event occur. The preset event may be the detection of a banking transaction, the detection of the nth banking transaction or a predefined date reached by the RTC.

The occurrence of a banking transaction may be detected in several ways. For instance, the processing unit 24 can be adapted to detect a banking transaction based on the presence of a RF field, the presence of power provided to the physical communication interface 25 or data exchanged through the physical communication interface 25.

The updating agent 70 is configured to analyze the set 80 according to a preset rule for generating a corrective value 90 intended to be applied to the RTC.

For instance, the updating agent 70 may compute the corrective value 90 as the average drift (i.e. Average value among all pairs stored in the set 80.)

In a variant, the updating agent 70 may compare each pair of the set 80 versus a maximum theoretical drift (based on hardware characteristics of the RTC). Thus the updating agent 70 may discard pairs having an aberrant value.

Preferably, the updating agent 70 may be implemented as a software program. Alternatively the updating agent 70 may be a hardware component.

In another example, a communication link 28 (shown in plain line) is set between the processing unit 24 and the physical communication interface 25. Thanks to the communication link 28, the processing unit 24 can exchange data with the chip 23. In particular, the processing unit 24 can retrieve data from the log 83. The processing unit 24 and the chip 23 may communicate through ISO-7816 protocol (the processing unit 24 acting as a reader), through SWP (Single Wire Protocol) or any relevant protocol.

Advantageously, the processing unit 24 is able to provide the chip 23 with power by using the battery 95.

The processing unit 24 comprises an updating agent 70 which is configured to detect the occurrence of a banking transaction carried out by the chip 23. For instance, the processing unit 24 may use the spying link 29 as described above to detect a banking transaction between the chip 23 and the external device 40. The chip 23 is assumed to store, in a log 83, applicative data 30 corresponding to the backing transaction. The updating agent 70 is configured to get a time reference 51 from the RTC when a banking transaction is detected. The updating agent 70 is configured to associate the retrieved time reference 51 with the applicative data 30 and to store the time reference 51 in a set 81. For instance, the association may be made thanks to the recording order of the data stored in the log 83 and the set 81. Alternatively, a specific identifier or flag may be used to associate a time 50 with its corresponding time reference 51.

The processing unit 24 is adapted to retrieve the time reference 51 when the banking transaction occurs (or just after the end of the transaction) so that the time 50 and the time reference 51 are assumed to have been captured in a very short time window.

It is to be noted that the processing unit 24 has access to its own non-volatile memory area for storing the set 81.

The updating agent 70 is configured to store as many time reference as detected banking transactions.

The updating agent 70 is configured to analyze both the log 83 and the set 81 when a preset event occur. The preset event may be the detection of a banking transaction, the detection of the nth banking transaction or a predefined date reached by the RTC.

The updating agent 70 is configured to analyze the log 83 and the set 81 according to a preset rule for generating a corrective value 90 intended to be applied to the RTC. The updating agent 70 is adapted to retrieve the time in the relevant applicative data stored in the log 83. For instance, the updating agent 70 may access the log 83 through a request (or command) sent to the chip 23 via the communication link 28. By retrieving each measured time 50 from the log 83 and the associated time reference 51 from the set 81, the updating agent 70 can get the pair(s) (time 50, time reference 51) and compute the drift. The updating agent 70 can then compute the corrective value 90 from these pairs.

Although the processing unit 24 and the chip 23 have been described has separated components in the above-presented example, they also may be merged in a single hardware component, like a microcontroller. For instance, the secure element (chip) 23 may include the processing unit 24.

Figure 2:
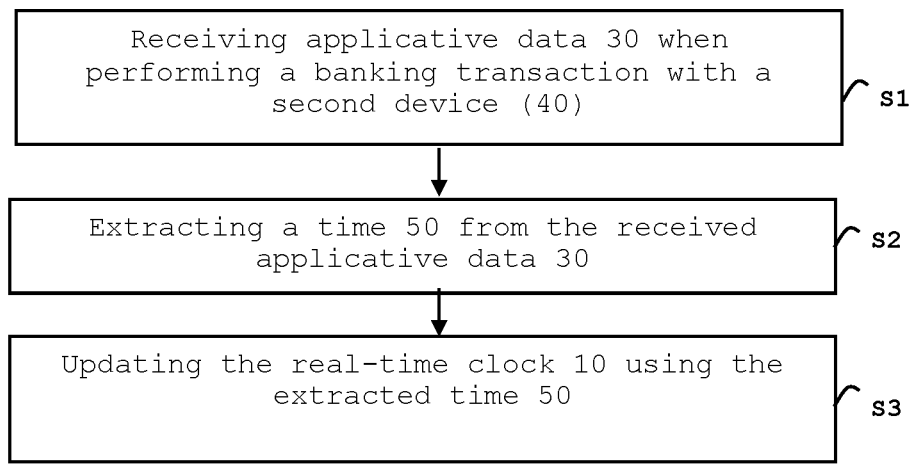
FIG. 2 shows a first exemplary flow diagram for updating the RTC in a portable tamper-resistant device according to the invention.

FIG. 2 shows a summary of the method according to the invention.

At first step S1, the portable tamper-resistant device 20 receives applicative data 30 from another device 40 (e.g. a server or a reader) when performing a banking transaction with this other device 40.

At step S2, the portable tamper-resistant device 20 extracts a time 50 from the received applicative data 30.

Then at step S3, the portable tamper-resistant device 20 updates the real-time clock 10 using the extracted time 50. For instance, the portable tamper-resistant device 20 computes a corrective value 90 based on the time 50 and updates the real-time clock 10 thanks to the corrective value 90.

Figure 3:
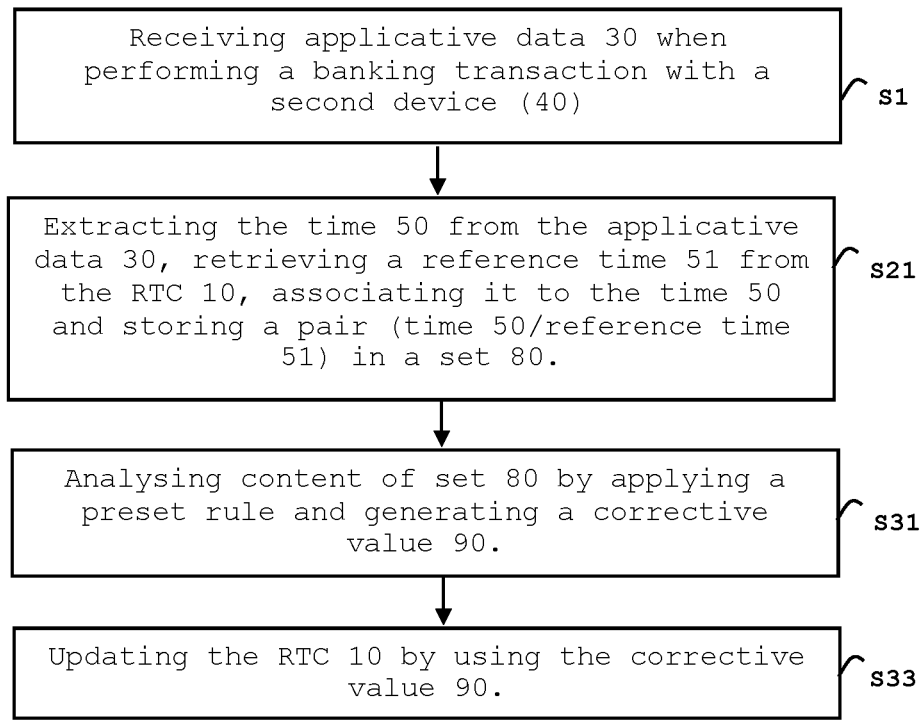
FIG. 3 shows a second exemplary flow diagram for updating the RTC in a portable tamper-resistant device according to the invention.

FIG. 3 shows an exemplary flow diagram for updating the RTC in a portable tamper-resistant device according to the invention.

This flow corresponds to the case where the processing unit 24 spies the applicative data thanks to the spying link 29 as described at FIG. 1. (I.e. no communication link 28).

The first step S1 is similar to the one described at FIG. 2. Step S21 shows a detailed step corresponding to step S1 of FIG. 2. At step S21, the portable tamper-resistant device 20 extracts a time 50 from the received applicative data 30, retrieves a reference time 51 from the RTC, associates the time 50 with the reference time 51 and stores the pair (time 50, reference time 51) in a set 80.

Steps S31 and S33 correspond to step S3 of FIG. 2.

At step S31, the portable tamper-resistant device 20 analyzes the content of the set 80 and applies a preset rule for generating a corrective value 90.

For example, the preset rule may specify that the corrective value 90 is computed as the average drift among all stored pairs. In another example, the lowest drift and the higher drift may be discarded for computing the average drift. In another example, the preset rule may check that the corrective value 90 is compatible with the maximum drift acceptable for the RTC by taking into account the time elapsed since the last synchronization operation and the characteristics of the hardware components of the RTC.

Advantageously, the preset rule may take into account the time zone in which the banking transaction occurred so as to compute drifts which share a common time base.

In another example, the preset rule may check that the set 80 comprises at least a predetermined number of acceptable (i.e. non aberrant) drift values to perform the calculation of the corrective value 90.

Then at step S33, the portable tamper-resistant device 20 updates the real-time clock 10 thanks to the corrective value 90.

Figure 4:
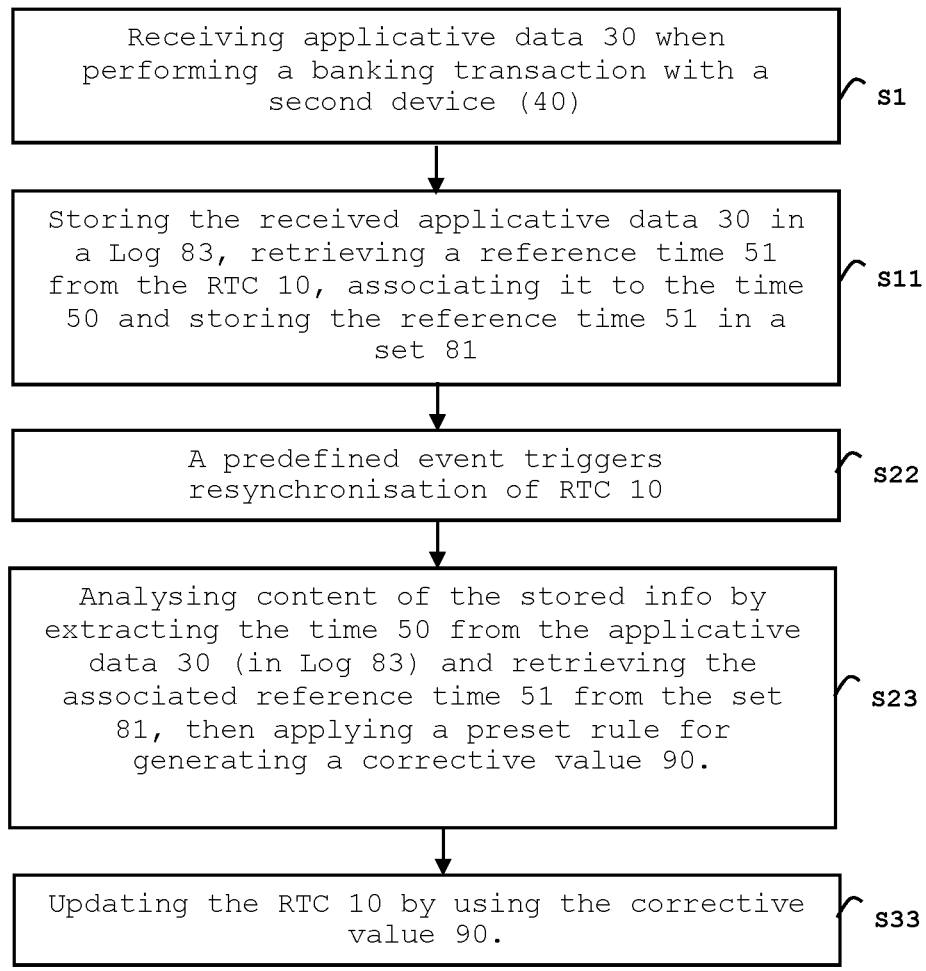
FIG. 4 shows a third exemplary flow diagram for updating the RTC in a portable tamper-resistant device according to the invention.

FIG. 4 shows another exemplary flow diagram for updating the RTC in a portable tamper-resistant device according to the invention.

This flow correspond to the case where the processing unit 24 communicates with the chip 23 to request the content of the log 83 using the communication link 28 as described at FIG. 1.

The first step S1 is similar to the one described at FIG. 2. At step S11, the portable tamper-resistant device 20 stores the applicative data 30 linked to the banking transaction performed with the device 40. The applicative data 30 are stored in a log 83 by the chip 23. The portable tamper-resistant device 20 retrieves a reference time 51 from the RTC 10 at the time the banking transaction is detected (or just after the end of the transaction) and associates it with the applicative data 30 (or with the time 50 comprised in the applicative data 30). The portable tamper-resistant device 20 stores this reference time 51 in a dedicated set 31 which may be located in the processing unit 24.

For example, the log 83 may comprise, for each banking transaction, applicative data which can be retrieved by the processing unit 24 using the following command:

Read Record: 0x00B2016415
Data
Out: 0x000000000001400840084012030200002359010001
SW: 9000
where the Transaction Date is 12/03/02 and the Transaction Time is 23h 59mn 01s.

At step S22, a predefined event triggers the synchronization operation of the RTC 10. For instance, the predefined event may be the detection of the 10$^{th}$ successful banking transaction since the last synchronization of the RTC. For instance, the predefined event may be the fact that the measured drift reaches a preset threshold or that the timestamp of the transaction reaches a new month compared to the month of the last RTC synchronization.

Step S23 shows a detailed step corresponding to the step S2 of FIG. 2. If needed, the processing unit can provide the chip 23 with power coming from the battery 95 when retrieving data stored in the log 83. The portable tamper-resistant device 20 extracts the relevant time values from the log 83 and the corresponding time reference from the set 81. Then it reconstructs each pair comprising a time and its associated reference time. Then the portable tamper-resistant device 20 analyzes the content of these pairs and applies a preset role for generating a corrective value 90.

For example, the preset rule may specify that the corrective value 90 is computed as the last measured drift. (I.e. the drift computed for the last pair)

Then at step S33, the portable tamper-resistant device 20 updates the real-time clock 10 thanks to the corrective value 90.

Figure 5:
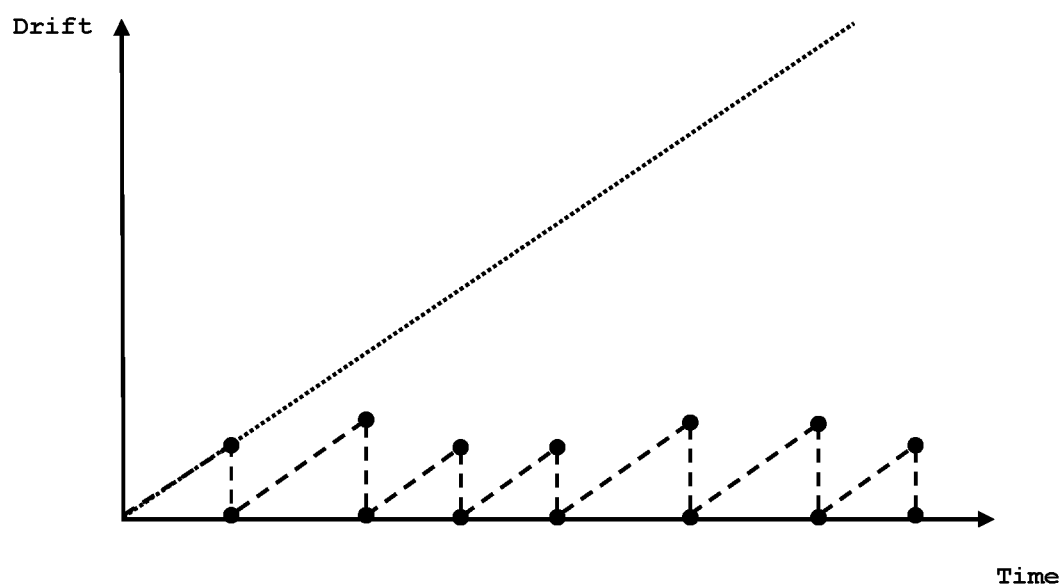
FIG. 5 shows an example of drift evolution with the invention.

FIG. 5 shows as example of drift evolution with and without the invention.

If no synchronization of the RTC is performed, the drift can grow over time as shown by the dotted line. It is to be noted that the growth of the drift is not necessary regular. It can speed up or slow down depending on the conditions of use of the portable device 20 or ageing of the RTC components.

The dashed line shows evolution of the drift over time when the present invention is used. The drift is reduced to zero (or near zero) several times during the life of the RTC.

Thanks to the invention it is possible to easily and smoothly synchronize the real-time clock of a portable secure device.

It is to be noted that the portable tamper-resistant device can protect itself against attacks aiming at updating the RTC. In case of spying of data exchanged between the chip 23 and the external device 40, the processing unit 24 can take into account only valid transactions (i.e. ending with SW 0x9000) which comprise a successful PIN verification reflecting the user's agreement. In all cases, the processing unit 24 can estimate a normal drift and accept correction only if time/correction matches with an acceptable range compared to theoretical drift.

The invention is not limited to the described embodiments or examples. In particular the described examples and embodiments may be combined. In particular, the portable device may collect a single time value or several time values before updating the RTC current time.

It is to be noted that the banking transaction may be a payment transaction, a request for banking authorization or a re-credit for example.

It is to be noted that the invention applies to any portable tamper-resistant device able to run a banking transaction and to receive related applicative data including a time intended to date the transaction.

The invention is not limited to portable secure devices having a display or a keyboard. According to the invention, the corrective value may be computed using a timestamp extracted from applicative data coming from banking transaction which has not been successfully run.

The invention claimed is:

1. A computer-implemented method for managing a real-time clock embedded in a portable tamper-resistant device, said real-time clock having a drift, wherein said portable tamper-resistant device comprises the real-time clock, a physical communication interface to communicate with an external device, a secure element, and a processing unit managing the real-time clock, the processing unit being distinct from the secure element, a spying link being set between the processing unit and the physical communication interface, wherein the method comprises:

receiving, by the portable tamper-resistant device, through the physical communication interface, applicative data during a banking transaction with the external device and storing the received applicative data in the portable tamper-resistant device;

detecting, by the processing unit of the portable tamper-resistant device, using the spying link, that the banking transaction occurs, by spying data exchanged between the secure element and the external device through the physical communication interface;

retrieving, by the processing unit of the portable tamper-resistant device, a time reference from the real-time clock when the banking transaction is detected by the processing unit and associating the retrieved time reference to the received applicative data;

extracting, by processing unit of the portable tamper-resistant device, a time from said received applicative data, and computing, by the processing unit of the portable tamper-resistant device, a corrective value using both said time extracted from said received applicative data and the time reference, then compensating said drift by updating the real-time clock with the corrective value.

2. The method according to claim 1, wherein the processing unit comprises a memory and wherein each time a banking transaction is detected by the processing unit, the processing unit generates a captured value reflecting the drift between the time extracted from the received applicative data and the time reference, then stores in its memory, a set comprising the generated captured value.

3. The method according to claim 2, wherein the captured value is a pair comprising the time extracted from received applicative data and the time reference retrieved from the real-time clock.

4. The method according to claim 2, wherein the captured value is the difference between the time extracted from the received applicative data and the time reference retrieved from the real-time clock.

5. The method according to claim 2, wherein the set comprises several captured values corresponding to as many detected banking transactions and wherein said processing unit computes the corrected value as an average value among captured values of the set.

6. The method according to claim 2, wherein the set comprises several captured values corresponding to as many detected banking transactions and wherein said processing unit compares each captured value of the set versus a maximum theoretical drift and discards every captured value having an aberrant value.

7. The method according to claim 1, wherein the secure element stores in a memory thereof a log comprising applicative data of the banking transaction, wherein the processing unit comprises a memory and wherein, each time a banking transaction is detected by the processing unit, the processing unit stores in its memory, a set comprising the time reference retrieved from the real-time clock, and wherein the processing unit accesses both the log in the memory of the secure element and the set in its own memory to compute the corrective value.

8. The method according to claim 7, wherein a communication link is set between the processing unit and the physical communication interface and wherein the processing unit accesses the log by sending a request to the secure element via the communication link.

9. A portable tamper-resistant device comprising a real-time clock having a drift, a physical communication interface to communicate with an external device, a secure element, and a processing unit managing the real-time clock, the processing unit being distinct from the secure element,
wherein a spying link is set between the processing unit and the physical communication interface,
wherein the secure element comprises a memory and a processor and instructions stored thereon that, when executed, cause said secure element to receive, through the physical communication interface, applicative data during a banking transaction with the external device and to store said received applicative data in the portable tamper-resistant device;
wherein the processing unit of the portable tamper-resistant device comprises a processor unit and instructions stored thereon that, when executed, cause said processing unit to;
detect, using the spying link, that the banking transaction occurs, by spying data exchanged between the secure element and the external device through the physical communication interface;
retrieve a time reference from the real-time clock when the banking transaction is detected by the processing unit of the portable tamper-resistant device and associate the retrieved time reference to the received applicative data;
extract a time from said received applicative data; and compute a corrective value using both said time extracted from the received applicative data and the time reference then compensate the drift by updating the real-time clock with the corrective value.

10. The portable tamper-resistant device according to claim 9, wherein the processing unit of the portable tamper-resistant device comprises a memory and wherein each time a banking transaction is detected by the processing unit, the processing unit generates a captured value reflecting the drift between the time extracted from the received applicative data and the time reference, then stores in its memory, a set comprising the generated captured value.

11. The portable tamper-resistant device according to claim 10, wherein the captured value is a pair comprising both the time extracted from the received applicative data and the time reference retrieved from the real-time clock.

12. The portable tamper-resistant device according to claim 9, wherein the portable tamper-resistant device is a bank smart card.

13. The portable tamper-resistant device to claim 8, wherein the captured value is the difference between the time extracted from the received applicative data and the time reference retrieved from the real-time clock.

14. The portable tamper-resistant device according to claim 8, wherein the set comprises several captured values corresponding to as many detected banking transactions and wherein the processing unit computes the corrective value as an average value among the captured values of the set.

15. The portable tamper-resistant device according to claim 10, wherein the set comprises several captured values corresponding to as many detected banking transactions and wherein the processing unit compare each captured value of the set versus a maximum theoretical drift and discards every captured value having an aberrant value.

16. The portable tamper-resistant device according to claim 9, wherein the secure element stores in its memory a log comprising applicative data of the banking transaction, wherein the processing unit comprises a memory and wherein, each time a banking transaction is detected by the processing unit, the processing unit stores in its memory, a set comprising the time reference retrieved from the real-time clock, and wherein the processing unit accesses both the log in the memory of the secure element and the set in its own memory to compute the corrective value.

17. The portable tamper-resistant device according to claim 16, wherein a communication link is set between the processing unit and the physical communication interface and wherein the processing unit accesses the log by sending a request to the secure element via the communication link.

* * * * *